US007765664B2

(12) United States Patent
Duarte

(10) Patent No.: US 7,765,664 B2
(45) Date of Patent: Aug. 3, 2010

(54) CYLINDER VALVE SPRING COMPRESSOR

(76) Inventor: Romeo Antonio Duarte, 7314 Sabinal Crek Dr., Richmond, TX (US) 77469

(*) Notice: Subject to any disclaimer, the term of this patent is extended or adjusted under 35 U.S.C. 154(b) by 0 days.

(21) Appl. No.: 12/228,777

(22) Filed: Aug. 15, 2008

(65) Prior Publication Data

US 2009/0044391 A1 Feb. 19, 2009

Related U.S. Application Data

(60) Provisional application No. 60/964,840, filed on Aug. 15, 2007.

(51) Int. Cl.
*B23P 19/04* (2006.01)
*B23P 17/00* (2006.01)

(52) U.S. Cl. .......................... 29/215; 29/255; 29/281.1; 29/888.46

(58) Field of Classification Search ................... 29/215, 29/213.1, 888.46, 227, 255, 281.1
See application file for complete search history.

(56) References Cited

U.S. PATENT DOCUMENTS 4,962,918 A * 10/1990 Yang .......................... 269/156
5,365,647 A * 11/1994 Senkow ........................ 29/220
5,375,308 A * 12/1994 Harris ......................... 29/215
6,434,807 B1 * 8/2002 Begin .......................... 29/227
6,473,965 B2 * 11/2002 Levy et al. ............... 29/888.42
7,296,787 B2 * 11/2007 Barrios et al. ................. 269/17
2003/0121134 A1 * 7/2003 Levy et al. ..................... 29/249
2009/0044391 A1 * 2/2009 Duarte ........................ 29/215

* cited by examiner

*Primary Examiner*—Lee D Wilson
(74) *Attorney, Agent, or Firm*—Kenneth A. Roddy

(57) ABSTRACT

A valve spring compressor apparatus and method for compressing cylinder valve springs for the removal and installation of their locks or keepers and for replacement of valve stem seals or broken springs on an internal combustion engine, while the cylinder head is mounted on the engine or supported on a work bench. A compressor tool adjustably mounted on a support assembly temporarily secured over the cylinder head has a pivoting hand lever and spring biased push rod which, when manually depressed, moves a compressing member at the bottom of the push rod downward to engage and depress the valve spring and its retainer to gain access and removal of the lock or keeper though openings in the compressor tool.

9 Claims, 5 Drawing Sheets

CYLINDER VALVE SPRING COMPRESSOR

CROSS REFERENCE TO RELATED APPLICATION

This non-provisional application claims priority of U.S. provisional application Ser. No. 60/964,840, filed on Aug. 15, 2007.

FIELD OF THE INVENTION

The present invention relates generally to manually operated valve spring compressing tools used in the removal and replacement of valve springs and valve stem seals on overhead camshaft cylinder heads, and more particularly to a valve spring compressor apparatus and method wherein a compressor tool adjustably mounted on a support assembly temporarily secured over the cylinder head has a pivoting hand lever and spring biased push rod which, when manually depressed, moves a compressing member at the bottom of the push rod downward to engage and depress the valve spring and its retainer to gain access and removal of the lock or keeper though openings in the compressor tool.

BACKGROUND OF THE INVENTION

Over time, valve stem seals lose effectiveness gradually and oil leaks into the combustion chambers, this oil gets burned during the power stroke producing hydrocarbons that exit from the tail pipe. Each valve is located on the cylinder head and is held firmly against its seat by a spring that presses it against the valve seat and the spring retainer and is secured to the valve stem by locks (keepers). In the past, different procedures or methods were use in order to replace valve stem seals or springs: one of the most common but time consuming procedures involves the removal of the cylinder head and using a C-clamp type spring compressor.

In one method and still the most preferred, the cylinder is pressurized with air in order to hold the valves, however, the disadvantage is the set up of the tool that permits the valve spring compressor to move from one valve spring to the other. It is also a time consuming method, and another disadvantage is the problem of firmly holding the tools in place that sometimes can result in injuries to the technician.

Another method was the use of a spring compressor tool that hooks onto the spring coil and compresses it by a screw type mechanism that is set onto the valve spring retainer. The disadvantage is that this tool only fits in few type cylinder head design.

There is still an existing need to provide an effective way for removal and installation of valve springs for the replacement of valve stem seals or the spring itself, by reducing the time and physical effort for the technicians, but also a safety method for the accomplishment of this special task in order to help reduce the amount of hydrocarbons released from the tail pipe to the atmosphere.

SUMMARY OF THE INVENTION

It is therefore an object of the present invention to provide an effective way to compress the valve spring of an internal combustion engine and remove its locks for the purpose of replacing valve stem seals or the valve spring itself.

It is another object of the present invention to safely compress the valve spring to remove its locks; for the replacement of valve stem seals or the valve springs while the head still mounted or when the cylinder head is removed from the engine.

It is another object of the present invention to reduce the amount of time use to perform the task of the removal and installation of valve springs.

These and other objects of the invention are provided by the present valve spring compressor which allows technicians to compress the valve springs of a combustion engine for the removal of their locks and installation as needed for the replacement of valve stem seals or broken valve springs, the valve spring compressor having the following features and advantages:

A cylindrical body element of the modular valve spring compressor tool includes a push rod, a return spring, a handle and a compressing member that is able to compress the valve spring by applying positive pressure to the handle. The cylindrical body element is mounted on a ring shape extension at one end of a transversal bar that is positioned on a bracket slidably disposed on a longitudinal bar that is slidably disposed on two brackets secured by bolts on the cylinder head such that the slidably disposed bracket can move to any position along the longitudinal bar.

Another feature and advantage of the present invention is that all parts are rigid, and made of steel or other suitable material, thus making the tool durable and safe.

Another feature and advantage of the present invention is that the cylindrical body element of the valve spring compressor can move back and forward, and left to right when mounted on the transverse bar that is slidably disposed on the bracket for the purpose of clearing obstacles and allow the positioning of the tool over any valve.

Another feature and advantage of the present invention is that the cylindrical body element of the valve spring compressor is threaded at the external lower portion of the body to allow adjustments in the height of the tool.

Another feature and advantage of the present invention is that the handle can rotate with the cylindrical body element of the valve spring compressor tool for the purpose of clearing objects and to adjust the height of the compressing member.

Another feature and advantage of the present invention is that the pushrod slides up and down in the cylindrical body of the valve spring compressor and is returned to the rest position by a spring, the push rod providing a push action for attachment of the compressing member and also assist in adjusting the height of the compressing member.

Another feature and advantage of the present invention is that different sizes of the compressing member are made to provide a proper push action on top of the valve spring retainers.

Another feature and advantage of the present invention is that the angle of the cylindrical body element of the valve spring compressor can be adjusted depending of the angle of the valve located around the cylinder head.

Another feature and advantage of the present invention is that the twin brackets have the same dimension and design and an elongated longitudinal bar is mounted on both brackets in two apertures.

A further feature and advantage of the present invention is that the cylindrical body element mounted on the transverse bar can be positioned on a different bracket or stands to allow the tool to be used in other cylinder head designs.

A still further feature and advantage of the present invention is that the valve spring compressor uses set points over the cylinder head which are the same threaded holes for the set up or installation of the caps that secure the overhead camshafts.

DETAILED DESCRIPTION OF THE INVENTION

Figure 1:
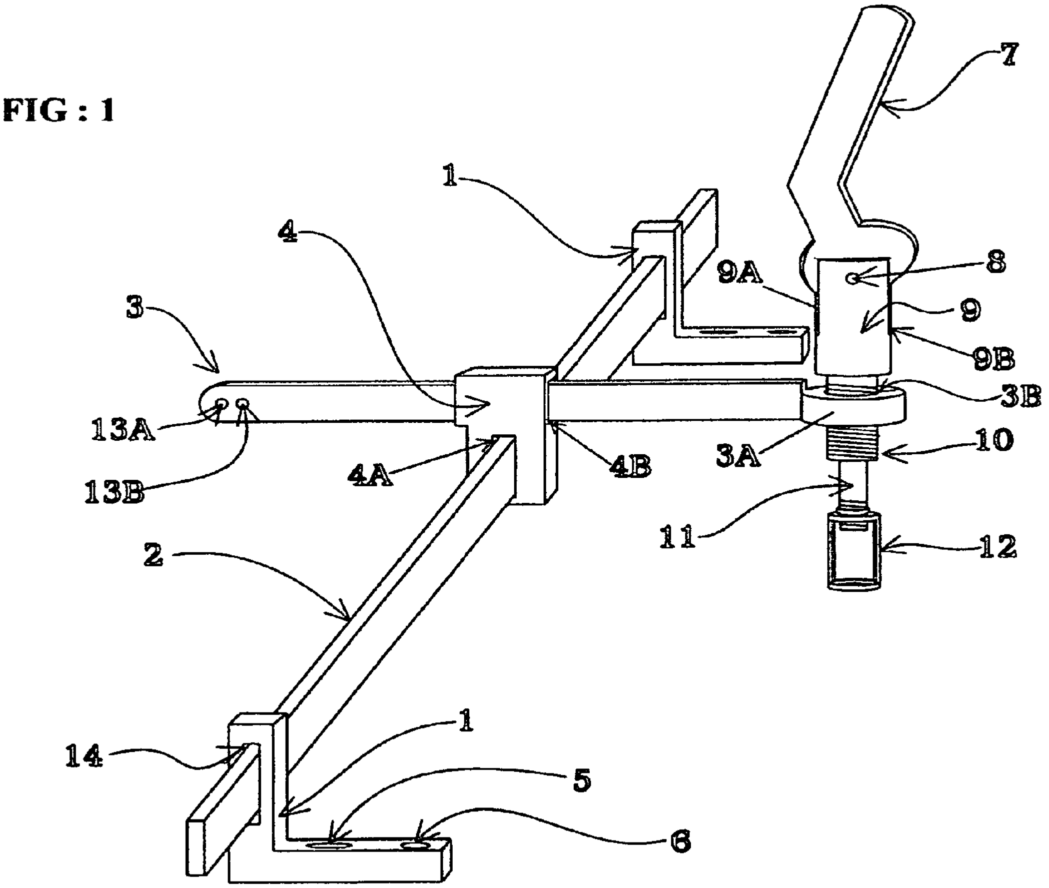
FIG. 1 is a perspective view of the valve spring compressor tool, wherein a longitudinal bar is mounted on twin brackets and a transverse bar is mounted on a single bracket slidably disposed on the longitudinal bar.

In the following discussion, the dimensions of the components are provided for purposes of example only, and are not limited thereto. FIG. 1 illustrates the complete assembly of the valve spring compressor when mounted on two brackets or stands 1 that are identical in shape and size. The bottom section or base of bracket 1 is 80 mm long and 20 mm high, the upper section is 52 mm high and 20 mm wide, and an elongated aperture 14 is located at 22 mm from the bottom edge of the base of bracket 1 and 5 mm from the top edge at the center of the upper portion of bracket 1. The thickness of bracket 1 is 17 mm.

Two apertures are disposed on the top of the bottom portion or base of bracket 1 that are used to secure bracket 1 onto the cylinder head while using two bolts. One aperture 6 is round and is of 7 mm in diameter and is located at 4 mm from right to left of base of bracket 1 as seen in FIG. 1.

The second aperture 5 on top of bottom portion of bracket 1 is an elongated aperture of 7 mm wide and 15 mm long and is used for mounting over different cylinder heads. The distance from aperture 5 to aperture 6 is 41 mm from the center of each aperture.

A longitudinal bar 2 is slidably mounted in two rectangular apertures 14, one aperture in each bracket 1. The size of the elongated apertures 14 are 7 mm wide and 27 mm high, while the dimensions of the longitudinal bar 2 are 6.8 mm×26.8 mm and its length is 350 mm.

On the longitudinal bar 2 is slidably disposed a bracket 4 that can move to any position along the longitudinal bar 2. Bracket 4 has an elongated aperture 4A in its lower section for the purpose of mounting the bracket on the longitudinal bar 2. The dimensions of this aperture are 7 mm×27 mm.

Another rectangular aperture 4B is on the upper section of the bracket 4 at a 90 degree angle from aperture 4A. The aperture 4B slidably receives a transversal bar 3. The dimensions of this aperture are 7 mm×27 mm, and its depth is 30 mm. This allows the main body of the tool to be positioned over any valve of the cylinder head and for the purpose of avoiding obstacles.

The upper section of bracket 4 is elongated to the back and is 30 mm long, and 35 mm from top to bottom, the lower section is 22 mm wide from right to left and the total height of the bracket is 64 mm.

The transverse bar 3 has a total length of 300 mm, it has a ring shaped extension 3A at one end of external diameter of 30 mm and a threaded aperture 3B of 20 mm at the center of this extension for threadedly mounting the cylindrical body 9 of the spring compressor tool. This ring extension is 15 mm high and the threaded aperture 3B is a right-hand metric M20 thread, having a pitch of 1.501 with maximum drill diameter of 18.5 mm.

The flat section of bar 3 is 270 mm long and 7 mm thick. At the end of this flat section on bar 3 are two round apertures of 5 mm each for mounting an adapter to facilitate the angle adjustment. The first aperture 13A is located at 4 mm from the end on the left and at the center line of the transverse bar 3, and has a diameter of 5 mm. A second aperture 13B of the same diameter is located at 10 mm to the right of the aperture 13A.

The upper section of the cylindrical body 9 extends 45 mm, and has a external diameter of 26 mm and a bore of 19 mm diameter that extends downwardly 40 mm in the cylindrical body. From the bottom end of the first bore section begins another bored section of 12 mm diameter, which serves as a guide for the push rod 11 that is installed inside the cylindrical body 9. Two elongated apertures 9A and 9B are disposed diametrically at a 90 degree angle from apertures 8.

The cylindrical body 9 of the valve spring compressor tool is threaded on its lower section 10, has a diameter of 20 mm and has a metric type thread M20 with a pitch of 1.501 and a minor diameter of 18.2 mm. The lower section 10 is 30 mm high and is used for threadedly mounting the cylindrical body element 9.

At the upper section of the cylindrical body 9 two round apertures 8 are diametrically disposed, each having a diameter of 5 mm for receiving a steel pin for securing a lever 7 on the upper section of cylindrical body 9.

At the bottom end of push rod 11 a threaded section is seen which extends 30 mm for the purpose of threadedly mounting compressing member 12 and for adjustments in the height of the compressing member.

Figure 2:
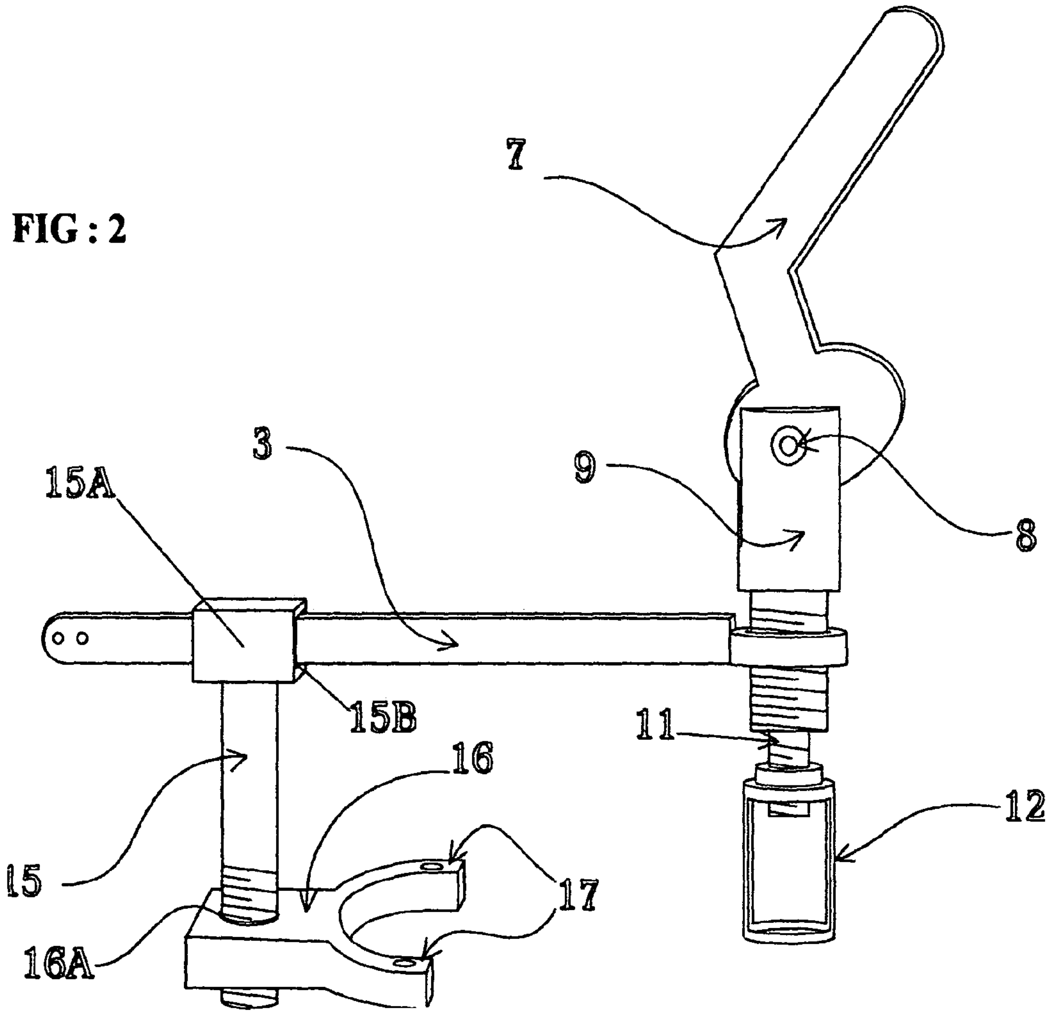
FIG. 2 is a perspective view of an alternate base bracket design and a cylindrical stand for positioning the valve spring compressor tool in a different configuration.

Referring now to FIG. 2 the cylindrical body means 9 with all components are shown mounted on transverse bar 3 but utilizing a different bracket 15 with a semicircular U-shaped base 16. This setup may be used for a large variety of 4-cylinder, V6 and V8 Asian import engines that have the cylinder valves positioned at an angle.

The U-shaped base 16 can be installed around the spark plug tube on two apertures located around the tube that are used to secure the camshaft caps. The U-shaped base 16 has an inside radius of 14 mm and outside radius of 22.5 mm. Two round apertures 17 of 7 mm in diameter are located at the center line of the semicircle, one at each side. This base 16 has an elongated extension that extends to the back for a total length of 60 mm.

A threaded aperture 16A is disposed 5 mm from the left end of the base 16. The threaded aperture 16 is 14 mm diameter and the body of the base 16 has a thickness of 20 mm. This threaded aperture is a right-hand metric M14 thread and has a pitch of 1.5 mm, a major diameter of 14 mm and minor diameter of 12.5 mm. This aperture is used for mounting the cylindrical bracket 15.

Bracket 15 has a total length of 88 mm, the bottom section is cylindrical in shape and has a diameter of 14 mm. The lower portion of bracket 15 is threaded and has a thread size M14, a pitch of 1.5, a major diameter 14 mm and a minor diameter of 12.52 mm. This threaded section extends upwardly 30 mm, and is used for mounting the bracket 15 over the base 16.

With this configuration we can rotate the bar 3 around the cylinder head for the purpose of avoiding objects and positioning the tool over any cylinder valve and also for adjusting the height of the cylindrical body 9.

The top section 15A of bracket 15 has a rectangular shape 30 mm long by 28 mm high and a thickness of 20 mm. The top section is provided with an aperture 15B which measures 7 mm×27 mm and 30 mm in depth for slidably mounting bar 3 on bracket 15.

Figure 3:
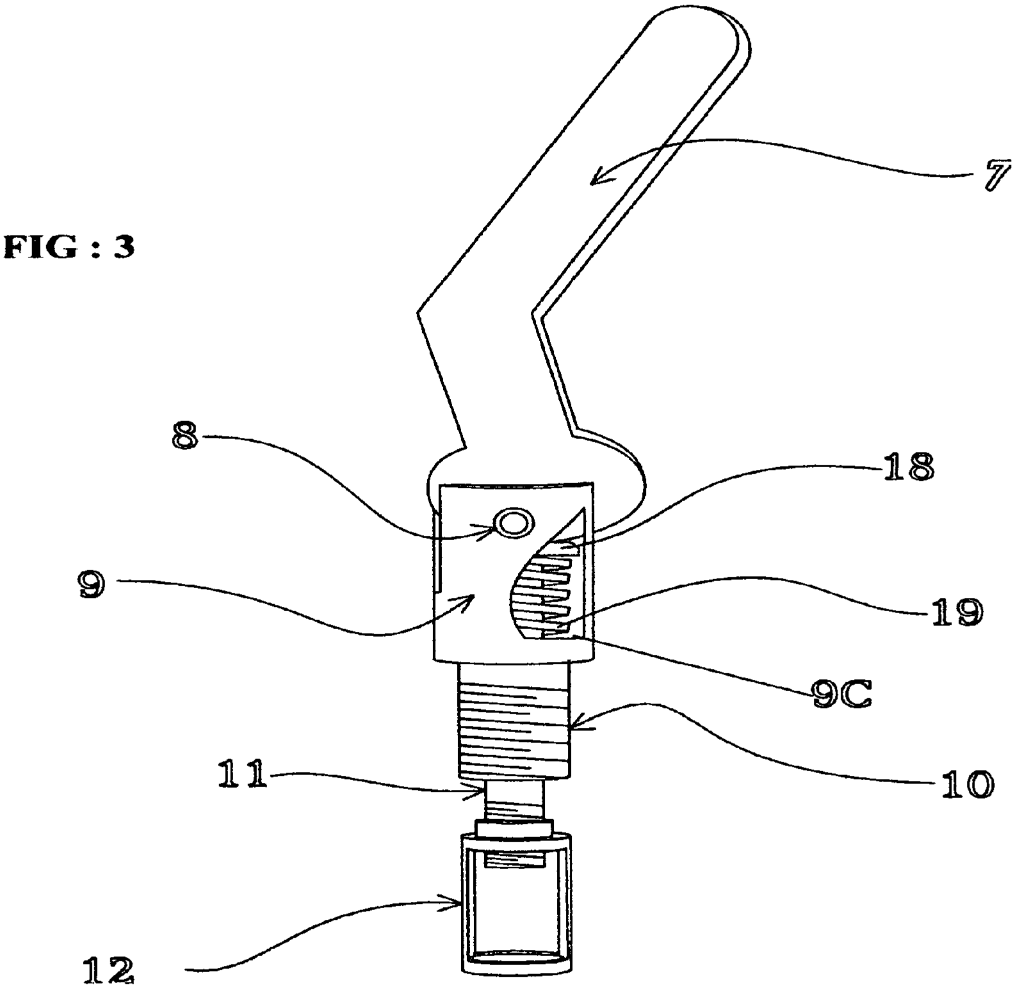
FIG. 3 is a sectional view of the cylindrical body element of the valve spring compressor tool, partially showing the return spring and the push rod of the valve spring compressor tool.

FIG. 3 shows a more detailed view of the cylindrical body 9 and the major components of the preferred embodiment. A portion 9C of the cylindrical portion is cut away showing the spring 19 and the head 18 of push rod 11. The spring 19 creates a push action under the head 18 of the push rod 11 to keep the push rod 11 in a rest position.

When applying positive pressure to handle 7, a pushing action is applied over the head 18 moving the push rod 11 down. The push action is transferred to the compressing member 12 and thereby compressing the valve spring. Different sizes of compressing members can be made depending of the diameter of the spring retainer.

Handle 7 has a flat extension at one end which is curved or angled at no more than a ninety degree angle and has a semicircular flat extension at the other end with an aperture of 5 mm which receives a steel pin extending through apertures 8 to pivotally secure handle 7 to cylindrical body 9.

Figure 4:
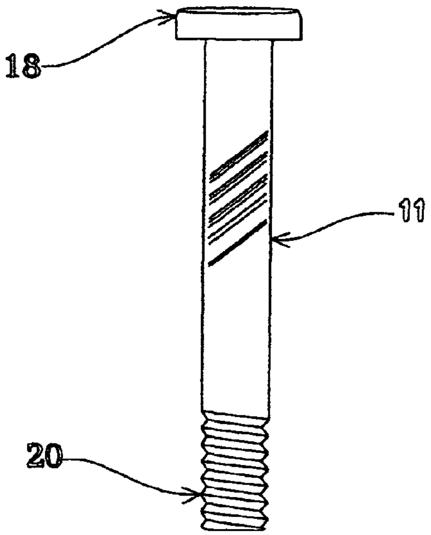
FIG. 4 is a perspective view of the push rod, showing the upper flat circular section and the threaded section at the bottom end.

FIG. 4 shows the push rod 11 in greater detail. The head 18 of push rod 11 is 3 mm thick and 17 mm in diameter. The push rod 11 shank has a diameter of 8 mm and extends downwardly 72 mm for a total length of 75 mm. The bottom portion of the push rod is threaded and its size is metric M10 and its pitch is 1.5, with a major diameter of 8 mm and a minor diameter of 6.780 mm.

Figure 5:
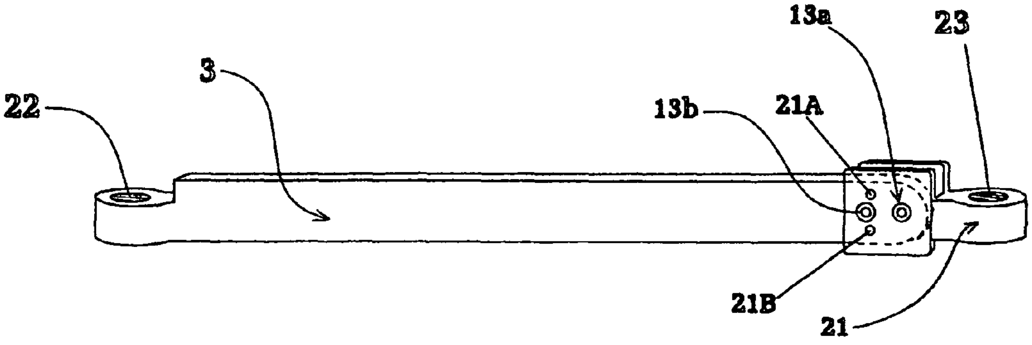
FIG. 5 is a perspective view of an attachment member that facilitates the angle adjustment of the main body of the valve spring compressor that attaches at the other end of the transverse bar.

FIG. 5 shows the transverse bar 3 and the adapter 21 in greater detail. The adapter 21 facilitates the angle adjustment of the cylindrical body of the tool when the adapter is mounted on the transverse bar 3, and the aperture 3A serves as a pivot point while 13B serves as a angle adjuster, changing the angle of the tool by 25 degrees when a pin is install in either of aperture 21A or 21B.

The adapter 21 has a ring shaped extension on the right hand side, as seen in FIG. 5, which has an outer diameter of 30 mm and at the center of which a threaded aperture 23 of is located. The threaded aperture is a right-hand metric size M20 thread, with a pitch of 1.501, a major diameter of 20 mm, and a minor diameter of 18.286.

Two elongated parallel spaced wall sections extend to the left of the adapter 21, as seen in FIG. 5 for receiving and mounting the transverse bar 3, each wall having axially aligned apertures which serve for securing and adjusting the adapter to different angles, as described above. Aperture 21A will change the angle by 25 degrees counterclockwise and aperture 21B will change the angle by 25 degrees clockwise.

Figure 6:
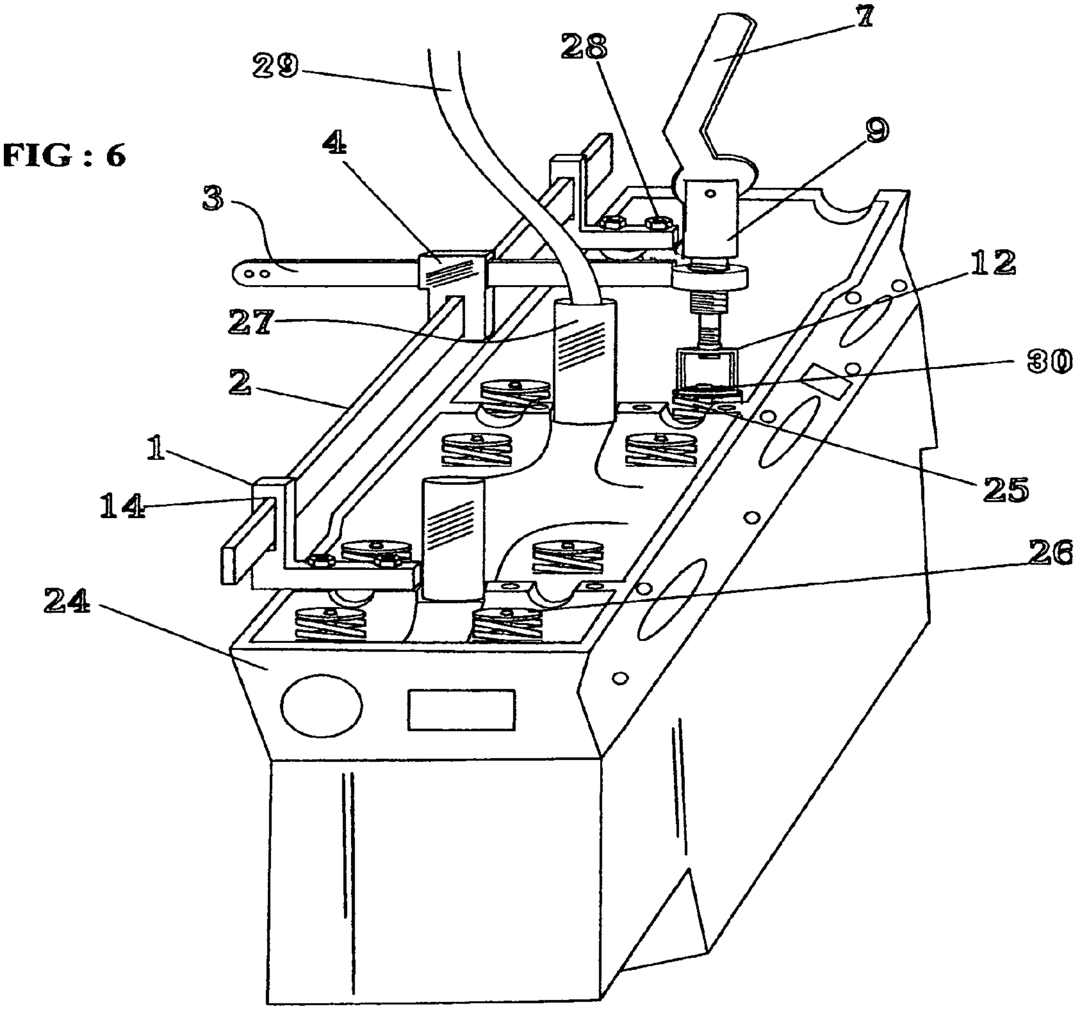
FIG. 6 is a perspective view of the valve spring compressor tool mounted over a cylinder head, using twin brackets.

Referring now to FIG. 6, the valve spring compressor tool is shown mounted on a cylinder head 24 that is mounted on an engine block. Some valves of the cylinder head have been omitted for purposes of more clearly showing the components of the invention.

Two brackets 1 are used in this configuration, which are secured by bolts 28 using the same threaded holes that are used for securing the overhead camshaft caps. The longitudinal bar 2 is mounted in apertures 14 and the bracket 4 slides along the longitudinal bar 2 mounted in aperture 4A of the bracket 4. Transverse bar 3 is positioned in the aperture 4B on the bracket 4 allowing the cylindrical body 9 to move to any direction or any position over the cylinder head 24. An air hose 29 is installed to pressurize the cylinder with regulated air from 40 to 50 psi. The air hose 29 is installed in the threaded spark plug hole in spark plug tube 27.

As seen in FIG. 6, the cylindrical body 9 is positioned over a retainer of cylinder valve 25 just like retainer of the numeral 26. When applying positive pressure to handle 7 the push rod 11 moves down transferring the downward force to compressing member 12 and applying pressure over the spring retainer, thereby compressing the valve spring and releasing the locks or keepers 30.

It should be understood that the above description, the dimensions, thread types and sizes of the embodiments and attached figures set forth in this specification are considered as illustrative only for a better understanding of the principles of the present invention.

It should also be understood that variations in size, materials, shape, form, function and manner of operation, assembly and use, are deemed readily apparent and obvious to one skilled in the art, after reading the present specification, and all equivalent relationships to those illustrated in the drawings and described in the specification are intended to be encompassed in the following claims defining the present invention.

The invention claimed is:

1. A valve spring compressor apparatus for compressing a cylinder valve spring for the removal of locks or keepers supported on a retainer and engaged with a groove at an upper section of a valve stem and retained thereon by pressure applied beneath the retainer by the valve spring, the valve being part of an overhead valve train of an engine cylinder head mounted on an engine or supported on a work bench, the apparatus comprising:

a support assembly including at least one generally L-shaped support bracket member having a horizontal base portion adapted to be removably secured to the cylinder head and a vertical portion extending upwardly therefrom;

a rigid elongate transverse bar slidably adjoined to said vertical portion of said support bracket to extend transverse thereto, said transverse bar having an internally threaded generally ring-shape element at one end thereof;

a compressor tool having a generally cylindrical body with an externally threaded lower portion threadedly received in said internally threaded ring-shaped element of said transverse bar, a smaller internal bore extending through a lower portion of said body and a coaxial larger diameter bore extending through an upper portion thereof defining a radial shoulder therebetween, an elongate generally cylindrical extensible and retractable push rod slidably disposed inside said body, said push rod having an externally threaded lower end extending through said smaller diameter bore and an enlarged diameter flat top end disposed in said larger diameter bore, a compression spring disposed in said body surrounding said push rod having one end engaged on said radial shoulder and an opposed end engaged on an underside of said push rod enlarged diameter flat top end to normally bias said push rod to a upwardly retracted position;

a valve spring compressing member having a top end plate threadedly engaged on said push rod externally threaded lower end and a bottom end plate connected thereto in vertically spaced relation by a pair of diametrically opposed vertical bars defining openings therebetween, said bottom end plate configured to receive the upper section of the valve stem and engage the valve spring retainer; and a hand lever pivotally connected with said cylindrical body upper portion having a curved surface at one end in contact with said push rod enlarged diameter flat top end and an elongate hand grip portion extending upwardly and outwardly therefrom to be gripped by a user; wherein in operation, said cylindrical body of said compressor tool assembly is positioned over the valve spring retainer, said hand lever is manually pivoted downward to engage said curved surface on said push rod top end and move said push rod downward to an extended position thereby engaging said bottom end plate of said valve spring compressing member on the valve spring retainer and depressing the valve spring and retainer so as to release the spring pressure applied by the valve spring beneath the retainer and the locks or keepers, which are then accessible and removable through said openings of said valve spring compressing member.

2. The valve spring compressor apparatus according to claim 1, wherein said support assembly includes a pair of said generally L-shaped support bracket members, each having a horizontal base portion adapted to be removably secured to the cylinder head and a vertical portion extending upwardly therefrom, a rigid elongate longitudinal bar slidably supported by said vertical portion of said support bracket members in a position above and adjacent to a longitudinal edge of the cylinder head, and a mounting bracket slidably mounted on said longitudinal bar; and said elongate transverse bar is slidably mounted on said mounting bracket to extend transverse to said longitudinal bar, and said mounting bracket and said transverse bar are slidable as a unit relative to said longitudinal bar and said bracket members for selectively positioning said cylindrical body of said compressor tool over selected valve spring retainers.

3. The valve spring compressor apparatus according to claim 1, wherein said horizontal base portion of said at least one L-shaped support bracket member is a generally flat portion having apertures therethrough at spaced apart locations adapted to correspond to the spacing of existing threaded holes that are used for mounting a camshaft, and said horizontal base portion is temporarily bolted to said cylinder head by bolts having shank portions received through said apertures and threaded engaged in the threaded holes.

4. The valve spring compressor apparatus according to claim 1, wherein said at least one L-shaped support bracket member of said support assembly is a generally L-shaped support bracket member, and said horizontal base portion is a generally flat U-shaped portion having a threaded aperture at one end, and said vertical portion of said L-shaped support bracket member is a vertical rod having a threaded lower end threadedly and rotatably engaged in said threaded aperture of said U-shaped portion to extend upwardly therefrom and having a mounting bracket at an upper end thereof; and said elongate transverse bar is slidably mounted on said mounting bracket to extend transverse to said longitudinal bar, and said vertical rod and said transverse bar are rotatable as a unit relative to said base portion of said support bracket member for selectively positioning said cylindrical body of said compressor tool over selected valve spring retainers.

5. The valve spring compressor apparatus according to claim 4, wherein the vertical distance of said elongate transverse bar and said valve spring compressing member bottom end plate relative to the valve spring retainer is selectively adjusted by rotation of said vertical rod and said transverse bar as a unit relative to said support bracket member.

6. The valve spring compressor apparatus according to claim 1, wherein said horizontal base portion of said at least one L-shaped support bracket member is a generally flat U-shaped portion having a central curved recess defining a pair of laterally spaced horizontal legs, said central curved recess adapted to partially encircle an existing spark plug tube, and each of said horizontal legs spaced apart and having an aperture therethrough at locations adapted to correspond to the spacing of existing threaded holes that are used for mounting a camshaft, and said base portion is temporarily bolted to said cylinder head by bolts having shank portions received through said apertures and threaded engaged in the threaded holes.

7. The valve spring compressor apparatus according to claim 1, wherein said internally threaded generally ring-shape element is pivotally mounted and releasably secured at one end of said elongate transverse bar to allow said cylindrical body of said compressor tool to be selectively positioned along a vertical axis or to be pivoted clockwise and counterclockwise relative to a vertical axis and secured at a selected angle.

8. The valve spring compressor apparatus according to claim 1, wherein said elongate transverse bar has a first said internally threaded generally ring-shape element at one end, and a second internally threaded generally ring-shape element pivotally mounted and releasably secured at an opposite one end thereof to allow said cylindrical body of said compressor tool to be selectively to be selectively positioned along a vertical axis when threadedly engaged in said first said ring-shaped element or to be pivoted clockwise and counterclockwise relative to a vertical axis and secured at a selected angle when threadedly engaged in said second ring-shaped element.

9. The valve spring compressor apparatus according to claim 1, wherein said top end plate of said valve spring compressing member is threadedly engaged on said push rod externally threaded lower end and the distance between said bottom end plate and the valve spring retainer is selectively adjusted by relative rotation between said valve spring compressing member and said threaded lower end of said push rod.

* * * * *